US010612371B2

(12) United States Patent
Stark et al.

(10) Patent No.: US 10,612,371 B2
(45) Date of Patent: Apr. 7, 2020

(54) PARTIALLY REFLECTIVE MATERIALS AND COATINGS FOR OPTICAL COMMUNICATION IN A WELLBORE (71) Applicant: Halliburton Energy Services, Inc., Houston, TX (US)

(72) Inventors: Daniel Joshua Stark, Houston, TX (US); John L. Maida, Houston, TX (US); David Andrew Barfoot, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 15/557,539

(22) PCT Filed: Apr. 21, 2015

(86) PCT No.: PCT/US2015/026853
§ 371 (c)(1),
(2) Date: Sep. 12, 2017

(87) PCT Pub. No.: WO2016/171670
PCT Pub. Date: Oct. 27, 2016

(65) Prior Publication Data
US 2018/0045041 A1 Feb. 15, 2018

(51) Int. Cl.
E21B 47/12 (2012.01)
E21B 47/01 (2012.01)
(Continued)

(52) U.S. Cl.
CPC ............ E21B 47/123 (2013.01); E21B 47/00 (2013.01); E21B 47/011 (2013.01);
(Continued)

(58) Field of Classification Search
None
See application file for complete search history.

(56) References Cited

U.S. PATENT DOCUMENTS 4,849,753 A * 7/1989 Merry ............... E21B 47/123
340/854.7
5,048,913 A * 9/1991 Glenn ............... G02B 6/02085
385/37
(Continued)

FOREIGN PATENT DOCUMENTS

GB 2474219 B 12/2012
WO 2009/085454 A1 7/2009
(Continued)

OTHER PUBLICATIONS

International Preliminary Report on Patentability issued in related PCT Application No. PCT/US2015/026853, dated Nov. 2, 2017, 11 pages.
(Continued)

Primary Examiner — Chico A Foxx
(74) Attorney, Agent, or Firm — John W. Wustenberg; Baker Botts L.L.P.

(57) ABSTRACT

Methods and systems for the use of partially reflective materials and coatings for optical communications in a wellbore environment are provided. In one embodiment, methods for remote communication in a wellbore comprise: positioning an optical fiber in the wellbore, wherein at least a portion of the optical fiber comprises a partially reflective coating; transmitting an output optical signal from an optical source through the optical fiber; and receiving a reflected optical signal from the optical fiber at an optical detector, wherein at least one optical property of the reflected optical signal is indicative of a downhole condition.

17 Claims, 4 Drawing Sheets (51) Int. Cl.
| | |
|---|---|
| *H04B 10/25* | (2013.01) |
| *E21B 47/00* | (2012.01) |
| *G01N 21/77* | (2006.01) |
| *G01N 21/552* | (2014.01) |
| *G01N 21/80* | (2006.01) |
| *G01N 21/21* | (2006.01) |
| *G02B 6/44* | (2006.01) |

(52) U.S. Cl.
CPC ......... *G01N 21/7703* (2013.01); *H04B 10/25* (2013.01); *G01N 21/21* (2013.01); *G01N 21/554* (2013.01); *G01N 21/80* (2013.01); *G01N 2021/7773* (2013.01); *G02B 6/4415* (2013.01)

(56) References Cited

U.S. PATENT DOCUMENTS

| | | | |
|---|---|---|---|
| 5,808,779 A | 9/1998 | Weis | |
| 6,091,490 A * | 7/2000 | Stellman | G01N 21/03 356/244 |
| 6,374,006 B1 * | 4/2002 | Islam | H01S 3/302 359/334 |
| 6,909,823 B1 * | 6/2005 | Sorin | G02B 6/022 385/10 |
| 7,450,626 B1 * | 11/2008 | Bass | H01S 3/08009 372/102 |
| 7,865,044 B2 * | 1/2011 | Farhadiroushan | G01J 5/08 385/12 |
| 10,502,040 B1 * | 12/2019 | Murugesan | E21B 43/20 |
| 2003/0003043 A1 * | 1/2003 | Ishida | B82Y 30/00 423/509 |
| 2004/0013368 A1 * | 1/2004 | Gilliland | G02B 6/3869 385/53 |
| 2005/0117157 A1 * | 6/2005 | Tarsa | G01N 21/39 356/437 |
| 2006/0152706 A1 * | 7/2006 | Butland | G06K 9/00577 356/71 |
| 2007/0126594 A1 | 6/2007 | Atkinson et al. | |
| 2008/0273852 A1 | 11/2008 | Parker et al. | |
| 2008/0291459 A1 * | 11/2008 | Meyer | G01C 19/721 356/462 |
| 2009/0042171 A1 * | 2/2009 | Rizoiu | A61O 5/40 433/224 |
| 2009/0168149 A1 * | 7/2009 | Petersson | G02B 6/02323 359/339 |
| 2009/0199630 A1 * | 8/2009 | DiFoggio | E21B 47/123 73/152.28 |
| 2009/0287198 A1 | 11/2009 | Hanley et al. | |
| 2011/0228263 A1 * | 9/2011 | Chuang | G01N 21/9501 356/300 |
| 2012/0039561 A1 | 2/2012 | MacDougall et al. | |
| 2012/0179378 A1 * | 7/2012 | Duncan | E21B 47/123 702/8 |
| 2013/0011102 A1 * | 1/2013 | Rinzler | G02B 6/3813 385/89 |
| 2013/0034324 A1 | 2/2013 | Laing et al. | |
| 2014/0219651 A1 * | 8/2014 | Ruffini | H04J 14/02 398/33 |
| 2015/0177411 A1 * | 6/2015 | Childers | G01V 8/16 250/269.1 |
| 2015/0289785 A1 * | 10/2015 | Bojovic | A61B 5/091 600/534 |
| 2015/0369927 A1 * | 12/2015 | Lee | G01T 1/2002 250/256 |
| 2016/0265339 A1 * | 9/2016 | Xia | H01B 7/046 |
| 2016/0276798 A1 * | 9/2016 | Zhao | H01S 3/2341 |
| 2017/0045201 A1 * | 2/2017 | Jones | F21V 9/30 |
| 2017/0343729 A1 * | 11/2017 | Zediker | G02B 6/02128 |
| 2018/0045895 A1 * | 2/2018 | Lee | G02B 6/3814 |

FOREIGN PATENT DOCUMENTS

| | | |
|---|---|---|
| WO | 2009/154601 A1 | 12/2009 |
| WO | 2011/094134 A2 | 8/2011 |

OTHER PUBLICATIONS

International Search Report and Written Opinion issued in related PCT Application No. PCT/US2015/026853 dated Nov. 24, 2015, 14 pages.

May, Russell G., et al. "Ruggedized Optical Fiber Sensors for Downhole Monitoring." (2011). Accessed at http://www.netl.doe.gov/kmd/cds/disk32/ngp2.pdf.

Curtis, Heber D. "Methods of silvering mirrors." Publications of the Astronomical Society of the Pacific 23.135 (1911):13-32.

Scott, R. B., J. W. Cook, and F. G. Brickwedde. "Silvering and evacuating pyrex dewar Flasks." Bureau of Standards J. of Res 7 (1931): 935-943.

Hu, Jiandong, et al. "Novel plating solution for electroless deposition of gold film onto glass surface." Surface and Coatings Technology 202.13 (2008): 2922-2926.

Weaver, J.H. et al., "Optical Properties of Selected Elements" in CRC Handbook of Chemistry and Physics (2014), pp. 12-126 to 12-144.

Sidgwick, John Benson, and Roger Charles Gamble. Amateur astronomer's handbook. Dover Publications, Inc., 1971 (1980 Reprint edition.).

* cited by examiner

PARTIALLY REFLECTIVE MATERIALS AND COATINGS FOR OPTICAL COMMUNICATION IN A WELLBORE

CROSS-REFERENCE TO RELATED APPLICATION

The present application is a U.S. National Stage Application of International Application No. PCT/US2015/026853 filed Apr. 21, 2015, which is incorporated herein by reference in its entirety for all purposes.

BACKGROUND

The present disclosure relates generally to methods and systems for optical communications in a wellbore environment. Hydrocarbons, such as oil and gas, are commonly obtained from subterranean formations that may be located onshore or offshore. The development of subterranean operations and the processes involved in removing hydrocarbons from a subterranean formation typically involve a number of different steps such as, for example, drilling a wellbore at a desired well site, treating the wellbore to optimize production of hydrocarbons, and performing the necessary steps to produce and process the hydrocarbons from the subterranean formation.

Upon drilling a wellbore that intersects a subterranean hydrocarbon-bearing formation, a variety of downhole tools may be positioned in the wellbore during exploration, completion, production, and/or remedial activities. For example, sensor components may be lowered into the wellbore during drilling, completion, and production operating phases of the wellbore. Sometimes the sensors are coupled to communication systems for conveying data indicative of sensed downhole parameters from the downhole sensor component to a surface location. For example, the downhole system (e.g., wireline, slickline) may include a fiber optic communication system for relaying sensed parameter measurement data from the downhole sensor to the surface for evaluation in near real time or real time. Optical communication systems may also be designed to provide downgoing signals from the surface to downhole tools.

In existing optical communication systems, an optical fiber is typically used to guide and propagate light waves from a source to a receiver (or detector). Due to the often harsh conditions downhole (e.g., high temperature and pressure), it is generally preferable to have only simple and robust components downhole. Accordingly, optical sources and detectors are often positioned at the surface of the wellbore instead of downhole. However, this requires that optical signals travel downhole and then return. Typical optical communications systems of this type have a u-bend or mini-bend downhole. However, such systems require twice as much optical fiber and significant space for the curved fiber, increasing the cost and size of the optical system. Further, such systems must be shielded from the wellbore environment by a protective sheath or jacket as they may be susceptible to high temperatures and pressures.

Optical communication systems often use reflectors such as fiber bragg gratings to reflect optical signals. However, typical reflectors are susceptible to downhole temperatures and pressures, reflect only a narrow band of wavelengths, or require specialized optical fibers.

Distributed sensing systems are used downhole to determine a parameter along the length of a fiber. For example, double-ended distributed temperature sensing employs a double-ended optical fiber to measure temperature over the length of an optical fiber. However, such systems take up a significant amount space in a crowded wellbore and rely on complex time division techniques to determine the profile of a downhole condition.

BRIEF DESCRIPTION OF THE DRAWINGS

These drawings illustrate certain aspects of some of the embodiments of the present disclosure and should not be used to limit or define the claims.

DETAILED DESCRIPTION

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

The present disclosure relates to methods and systems for optical communication in a wellbore environment. Particularly, the present disclosure relates to methods and systems for the use of partially reflective materials and coatings for optical communications in a wellbore environment.

More specifically, the present disclosure provides methods and systems for remote communication in a wellbore comprising positioning an optical fiber in a wellbore, wherein at least a portion of the optical fiber comprises a partially reflective material or coating. According to certain embodiments, the methods of the present disclosure comprise transmitting an output optical signal from an optical source through the optical fiber; and receiving a reflected optical signal from the optical fiber at an optical detector, wherein at least one optical property of the reflected optical signal is indicative of a downhole condition. In certain embodiments, the optical fiber is a concatenated optical fiber comprising a plurality of junctions, wherein at least one of the junctions comprises a partially reflective material. In certain embodiments, the present disclosure provides a system comprising at least one optical source coupled to the concatenated optical fiber and at least one optical detector coupled to the concatenated optical fiber capable of detecting an optical signal that reflects from the at least one junction. In certain embodiments, the present disclosure provides a method comprising positioning a concatenated optical fiber comprising a plurality of junctions in a wellbore, wherein at least one of the plurality of junctions comprises a partially reflective material; transmitting one or more output optical signals from an optical source to the concatenated optical fiber; and receiving one or more reflected optical signals at an optical detector coupled to the concatenated optical fiber, wherein at least one optical property of the one or more reflected optical signals is indicative of a downhole condition.

Among the many potential advantages of the methods and systems of the present disclosure, only some of which are alluded to herein, the methods and systems of the present disclosure may provide robust optical reflectors that can withstand the wellbore environment. The methods and systems of the present disclosure comprise materials that can withstand high temperatures and may not comprise any precision mirrors or other components sensitive to pressure or deformation.

Another advantage of the methods and systems of the present disclosure is the versatility of the partially reflective materials. The partially reflective materials or coatings disclosed herein may reflect broad or narrow bands of light. For example, in certain embodiments, metallically-coated optical fibers may reflect a wide range of wavelengths. For example, in some embodiments, a concatenated optical fiber with a junction comprising silver nanoparticles of a particular particle size may reflect a narrow band of wavelengths.

Another advantage of the methods and systems of the present disclosure is the reduced cost and size of the optical communication systems. As the same waveguide may contain both the upgoing and downgoing optical signals, the methods and systems of the present disclosure require half the amount of optical fiber as systems without partially reflective materials. Additionally, the present methods and systems may not require the components or space ordinarily needed to loop the fiber back towards the surface. The methods and systems of the present disclosure may also use standard optical fiber. For example, the partially reflective material or coating may be applied to most regular optical fibers, and the fiber may need no other modification or specialized material, unlike fiber bragg gratings.

Another advantage of some embodiments of the methods and systems of the present disclosure is the ability to reflect optical signals from different junctions along a concatenated optical fiber. For example, each junction of a concatenated fiber may comprise partially reflective materials with properties tuned to reflect some wavelengths or polarizations of light and allow others to pass through, generating distributed data while allowing an optical signal to pass to the end of the optical fiber.

As used herein, "reflect," "reflective," "reflection," and grammatical equivalents thereof refer to changing the direction of propagation of light. Use of these terms does not imply any particular mechanism, i.e., reflection, resonance, refraction, diffraction, polarization, absorption, etc. In some embodiments, changing the direction of propagation of light comprises surface plasmon resonance.

As used herein, "partially reflective," "partially reflected," and grammatical equivalents thereof refer to a reflective surface, coating, and/or material that that reflects some light or all light. In certain embodiments, partially reflective material or coatings may reflect some or all light of a particular wavelength, polarization, or other optical property.

According to certain embodiments, the partially reflective coating of the present disclosure may comprise an optical fiber coated with a partially reflective material. In some embodiments the partially reflective coating may coat the tip of the fiber, a longitudinal portion of the fiber, or any other portion of the fiber. In certain embodiments, the coating may comprise a single layer of partially reflective coating or several layers of partially reflective coatings. In certain embodiments, the coating or coatings may comprise several different materials. In certain embodiments, the coating may comprise a layer to improve adhesion, a layer to reflect light, a protective layer, or any combinations thereof. Examples of materials that may be suitable partially reflective materials and/or coatings include, but are not limited to metals (e.g., gold, silver, copper, aluminum, rubidium, titanium, platinum, chromium), dielectrics and dichroics (such as layers of magnesium fluoride, silicon dioxide, silicon monoxide, tantalum pentoxide, zinc sulfide, and titanium dioxide), metamaterials, nanoscale materials, nanoparticles, and any combination thereof.

Examples of nanoparticles that may be suitable for the methods and systems of the present disclosure include, but are not limited to metals (e.g., gold and silver), metal-coated dielectrics (e.g., gold-coated silica), semiconductor nanoparticles (e.g., quantum dots), magnetic nanoparticles (e.g., iron oxide), and any combination thereof. In some embodiments, the spectrum of light absorbed or reflected by the nanoparticles depends on the size and shape of the particles. Without being bound by theory, it is believed that the nanoparticles' interaction with light occurs by surface plasmon resonance. In some embodiments, the nanoparticles size and shape determine the absorption/reflection spectrum of the partially reflective material. In certain embodiments, the sizes and shapes of the nanoparticles may be tuned to reflect a narrow spectrum of light. In certain embodiments, a distribution of sizes and shapes of nanoparticles may be used to reflect a broad spectrum of light. In certain embodiments, nanoparticles may be used to form a nanocavity laser.

Metals that may be suitable for the methods and systems of the present disclosure include, but are not limited to gold, silver, copper, aluminum, rubidium, titanium, platinum, and any combination thereof.

In certain embodiments, the coating and/or material may comprise a polarizer. In certain embodiments, the coating may allow some polarizations of light to pass through while absorbing and/or reflecting other polarizations. A polarized partially reflective material may be a grid polarizer, a linear film polarizer, a dichroic film polarizer, a circular polarizer, a Glan-Thompson polarizer, a Glan-Taylor Polarizer, a double Glan-Taylor polarizer, a polarizing beam displacer, a rutile $TiO_2$ polarizer, a Brewster window, stretched molecules (e.g., stretched polymers), and birefringent crystals (e.g., optical calcite). In certain embodiments, the coating may comprise a depolarizer, such as a quartz-wedge depolarizer or a microretarder depolarizer.

Examples of nanoscale materials that may be suitable for partially reflective materials of the present disclosure include, but are not limited to carbon nanotubes, graphene, buckyballs, or the like.

In certain embodiments, metamaterials may comprise artificially engineered materials containing nanostructures that give them particular optical properties. In certain embodiments, metamaterials may comprise at least two different materials, for example, a metal and a dielectric. In some embodiments, a metamaterial may have a refractive index, relative permittivity, and/or relative permeability that is negative or zero. Examples of metamaterials that may be suitable for partially reflective materials of the present disclosure include split-ring resonators, periodic short wire, structured combinations of plasmonic and non-plasmonic nanoparticles, electro-optical tuners using the Pockels, Kerr, or nonlinear effects, or any combination thereof.

In certain embodiments, the wavelengths and intensity of light reflected by the coating will depend on the type of material and the thickness of the coating. In certain embodiments, the partially reflective coating thickness can be at least 1 nanometer, from about 1 nanometer to 100 nanometers, at least 0.01 skin depths, from about 0.01 skin depths to 6 skin depths, or less than 6 skin depths.

Skin depth is a measure of penetration depth, or how deep light or other radiation can penetrate into a material. Skin depth is defined as the depth at which the current density of the radiation or light falls to 1/e (about 37%) of its original value at the surface. Skin depth ($\delta$) is calculated by the following formula:

$$\delta = \sqrt{\frac{2\rho}{\omega\mu_r\mu_0}}.$$

wherein ($\rho$) is the resistivity of the reflective material, ($\omega$) is the angular frequency of the current, ($\mu_r$) is the relative magnetic permeability of the reflective material, and ($\mu_0$) is the permeability of free space.

In certain embodiments, the optical fiber may comprise a base coating. In some embodiments, a base coating may improve the adhesion of the partially reflective coating to the optical fiber. Examples of materials that may be suitable for the base coatings of the present disclosure include, but are not limited to chromium, tin, nickel, or any combination thereof.

In certain embodiments, a portion of the fiber may also be coated with a protective layer. In some embodiments, the protective layer protects the partially reflective coating from oxidizing or degrading downhole. Examples of protective layers that may be suitable for use in embodiments of the present disclosure include, but are not limited to room temperature vulcanizing silicone, shrink protectors, polyimide microtubes, pretreatment with sulfur, pretreatment with potassium sulfide, or any combinations thereof.

In certain embodiments, the partially reflective coating is applied to the fiber with a method free of any glues, epoxies, or other adhesive methods that may degrade downhole. In certain embodiments, a partially reflective coating is applied to the fiber by an evaporative process, such as heating up a partially reflective material under a vacuum in the presence of the fiber. In certain embodiments, a partially reflective coating is applied using plasma sputtering. In certain embodiments, a partially reflective coating is applied by a chemical process, such as dipping the fiber into a solution comprising a salt and a reducing alkaline. In some embodiments, the salt consists of silver nitrate. In certain embodiments, a gold metallic coating is applied by using gold nanoparticles as nucleation sites for the growth of a gold coating out of chloroauric acid. In certain embodiments, a partially reflective coating is applied by chemical vapor deposition.

Optical fibers that may be suitable for the methods and systems of the present disclosure include, but are not limited to silica and fluoride. In some embodiments, the optical fiber may be Corning's SMF-28®. In some embodiments, the optical fiber may be doped to raise the optical index of refraction (such as with germania, phosphorus pentoxide, or alumina), lower the optical index of refraction (such as with fluorine, boron oxide), or amplify certain wavelengths (such as with erbium, ytterbium, neodymium). In certain embodiments, the fiber may be polarized, using an elliptical core or by introducing asymmetric structures around the core. In certain embodiments, the end of the optical fiber may be flat, at an angle, or curved. In some embodiments, in a non-limiting example, the end of an optical fiber is disposed at an angle to direct light onto a wellbore fluid or a subterranean formation to analyze chemical composition (e.g., spectroscopy).

In certain embodiments, an output optical signal having a set of optical properties from the optical source may reflect off the partially reflective coating. In some embodiments, the reflected optical signal has a second set of optical properties. In certain embodiments, the first and the second sets of optical properties have the same optical properties. In some embodiments, the first and the second sets of optical properties have different optical properties.

In certain embodiments, an optical property of the reflected optical signal is indicative of a downhole condition. In some embodiments, an optical property of the output or reflected optical signal is modulated by an optical modulator or by a downhole condition's effect on the physical properties of the optical fiber. Optical properties include, but are not limited to amplitude, phase, polarization, frequency of the optical signal, and any combinations thereof.

Figure 1:
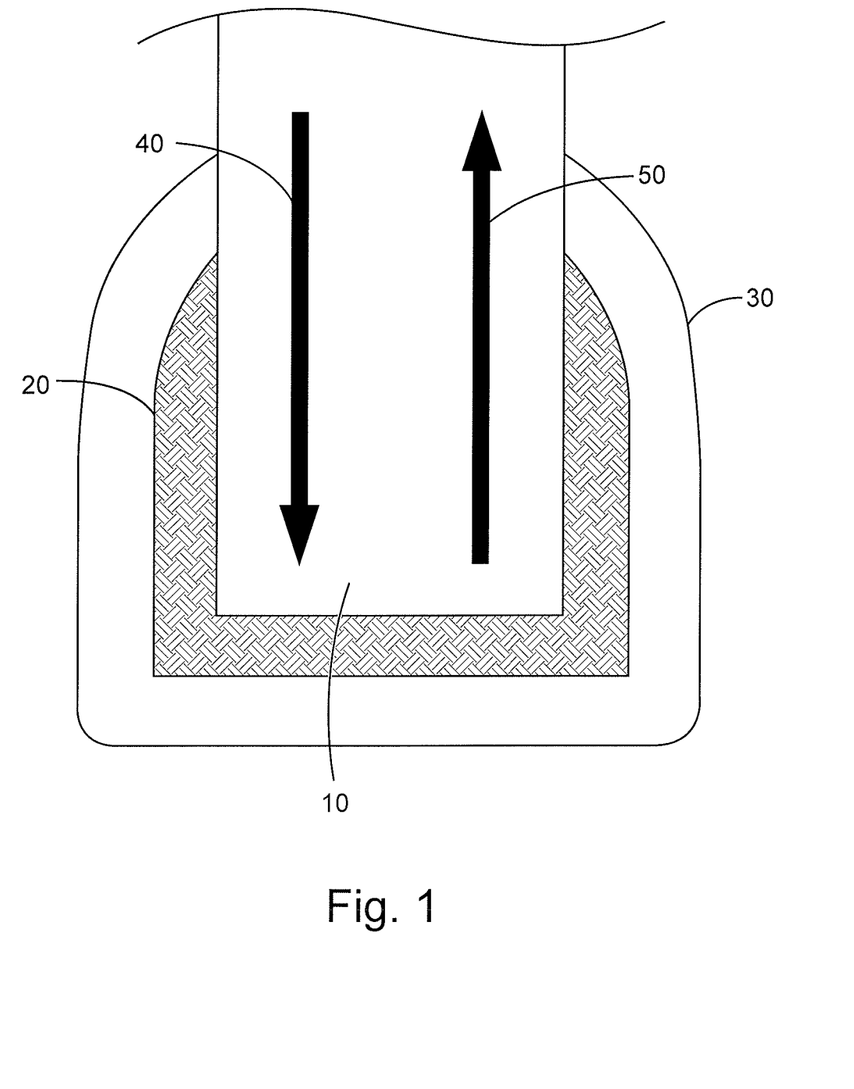
FIG. 1 is a schematic representation of the end of an optical fiber comprising a partially reflective coating in accordance with certain embodiments of the present disclosure.

For example, FIG. 1 depicts an embodiment of an optical fiber 10 with a partially reflective coating 20. The optical fiber 10 is shown with a protective layer 30. The output optical signal 40 travels down the optical fiber 10 and reflects off the partially reflective coating 20. The reflected optical signal 50 travels back along the same optical fiber 10. Although FIG. 1 shows a partially reflective coating 20 on a single optical fiber 10, in certain embodiments, more than one optical fiber may be bundled and coated together. In some embodiments, 2, 10, 100, or any other amount of optical fibers may be bundled and coated.

Figure 2:
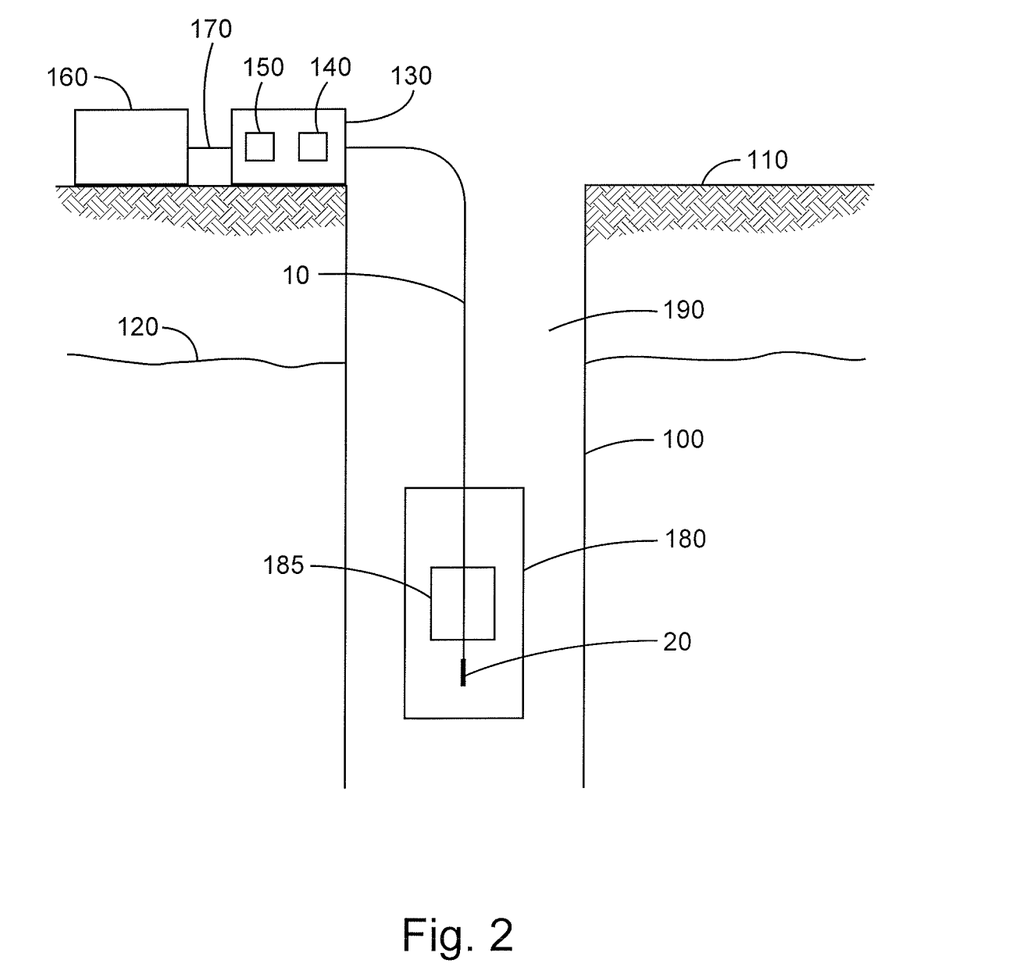
FIG. 2 is a diagram illustrating an optical fiber positioned in a wellbore in accordance with certain embodiments of the present disclosure.

FIG. 2 depicts an optical fiber 10 positioned in a wellbore 100. The wellbore 100 depends from the surface 110 and extends through the subterranean formation 120. Although shown as vertical, the wellbore 100 may include horizontal, vertical, slant, curved, and other types of wellbore geometries and orientations. The wellbore 100 can be cased or uncased. The optical fiber 10 is coupled to a transceiver 130 comprising an optical source 140 and an optical detector 150. The optical source 140 and optical detector 150 may also be separate. The transceiver 130 may also be coupled to a controller 160. The controller 160 may include one or more processing components to execute programs for determining or estimating the value of a sensed downhole condition based on the modulated optical signal (e.g., light wave) received at the transceiver 130 or optical detector 150. The controller 160 may be part of a rig-mounted control panel (not shown) or it may be packaged with the transceiver 130. The controller 160 may be communicatively coupled to the transceiver 130, optical source 140, and optical detector 150 via wired or wireless connection 170.

The optical fiber 10 extends from the transceiver 130 downhole to a subsurface device 180. The subsurface device 180 may comprise a tool string, a sensor, a spectrometer, a controller, optical equipment, other suitable subsurface equipment, or any combination thereof. A tool string 180 may be a sonic tool, formation analyzer, or a combination of sensing devices. The optical fiber 10 may be exposed to the wellbore environment 190, or it may be deposed within a protective sheath, drill string, slickline, or other wellbore component (not shown). The subsurface device 180 may comprise an optical modulator 185 that modulates the light within the optical fiber 10. The optical fiber 10 may comprise a partially reflective coating to reflect an optical signal. In some embodiments, the partially reflective coating of the present disclosure allows the optical signal to pass through the optical modulator 185 twice, before and after reflection, which may increase the modulation without requiring an increase in power of the optical modulator 185.

It should be noted that while FIG. 2 generally depicts the transceiver 130, optical source 140, and optical detector 150 on the surface, they could be elsewhere, including, but not limited to various locations in the wellbore 100 (e.g., on the slickline/wireline).

The optical modulator 185 may be coupled to a section of the optical fiber 10. Such a modulator may comprise a signal-controlled element possessing an electro-optical effect that is used to change an optical property (e.g., phase, frequency, amplitude, or polarization) of the light beam traveling through the optical modulator 185. The optical modulator 185 may be an electro-optic, acousto-optic, magneto-optic, electro-absorption or piezoelectric modulator, or any type of modulator capable of altering a light intensity, phase, frequency, polarity or combination thereof. Optical modulator 185 may encode data from sensors onto light transmitted via one or more optical fibers extending into a wellbore. In this manner, the sensor data is optically communicated from a downhole tool to a remote location. In certain embodiments, optical modulator 185 may encode data from a remote location onto light transmitted to a subsurface device.

Figure 3:
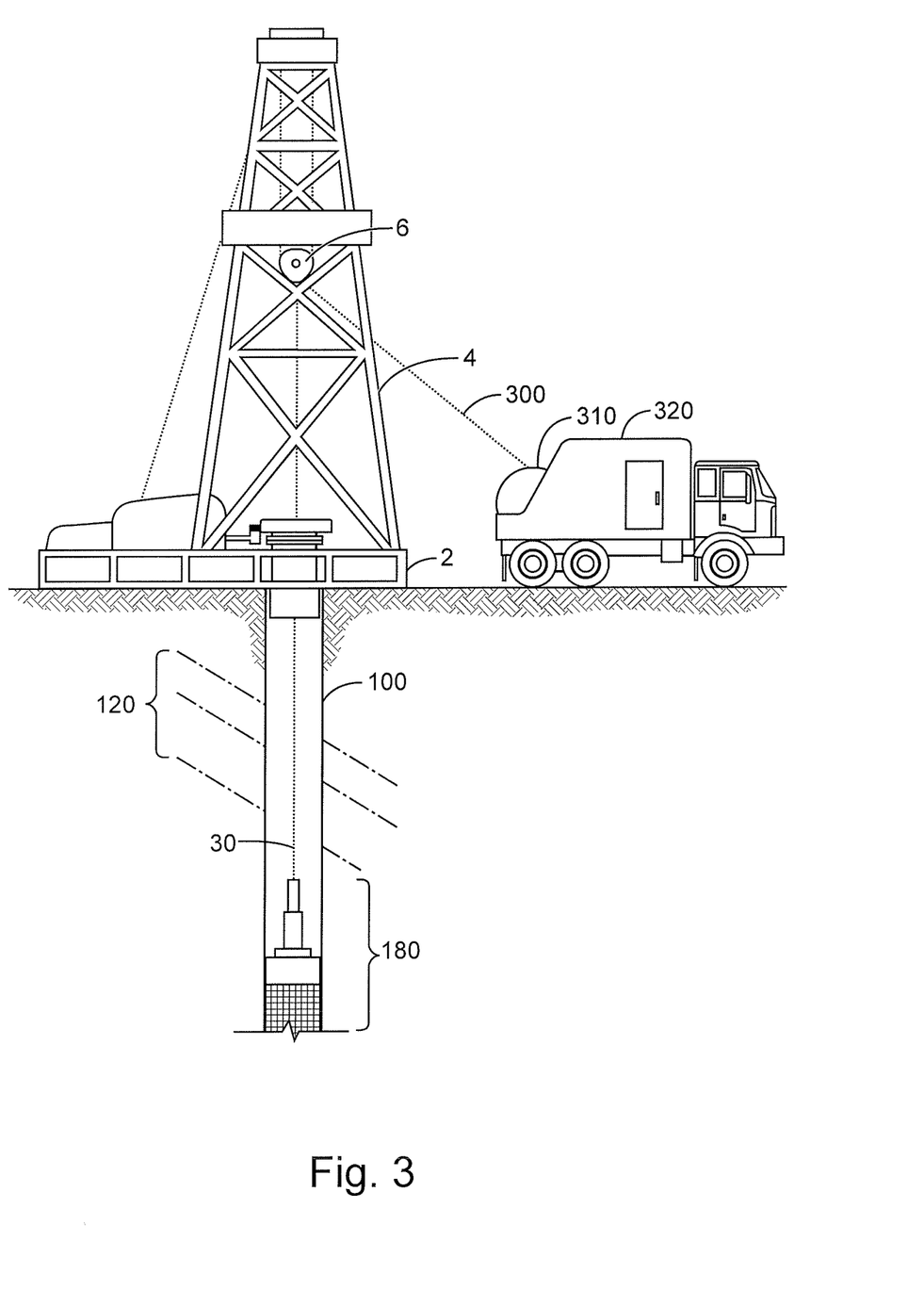
FIG. 3 is a diagram illustrating a slickline deployed in a wellbore drilling environment, in accordance with an embodiment of the present disclosure.

FIG. 3 illustrates oil well equipment being used in an illustrative drilling environment in accordance with certain embodiments of the present disclosure. A drilling platform 2 supports a derrick 4 having a traveling block 6 for raising and lowering a drill string (not shown). The drill string creates a wellbore 100 that passes through various subterranean formations 120. At various times during the drilling process, the drill string may be removed from the wellbore 100. Once the drill string has been removed, a subsurface device 180 may be lowered downhole to the desired setting depth via a conveying member 300. When the subsurface device 180 reaches the desired location within the wellbore 100, the subsurface device 180 is set in place within the wellbore 100. After the subsurface device 100 is securely set in place, the conveying member 300 may be retracted.

In some embodiments, the conveying member 300 may include a slickline or a wireline. Such slicklines/wirelines typically include one or more cables running the length of the conveying member 300 and secured within a polymer material surrounded by a protective coating sheath. The conveying member 300 may be unspooled from a spool 310 on a slickline truck 320 onto a sheave (e.g., traveling block 6 or some other sheave) on the drilling platform 2. From here, the conveying member 300 with the subsurface device 180 may be lowered (deployed) into the wellbore 100 and subsequently raised (retracted) from the wellbore 100 after placing the tool string or subsurface device 180 as described above.

In some embodiments, the conveying member 300 may include an optical fiber routed there through and used to communicate sensor information and/or telemetry signals from a position downhole to a position at the surface of the wellbore 100. The optical fiber may comprise a partially reflective coating.

In certain embodiments, the methods and systems of the present disclosure may comprise a concatenated optical fiber. In some embodiments, a concatenated optical fiber comprises a plurality of sections of optical fiber coupled together in series. In certain embodiments, the sections of optical fiber may be coupled together at junctions. In certain embodiments, the junctions may be formed by fusion splicing, optical connectors, or any other suitable means for connecting optical fibers. In certain embodiments, the concatenated optical fiber may be up to 20 km in length or greater.

In certain embodiments, a concatenated optical fiber is made by applying the partially reflective material to the end of an optical fiber (e.g., by sputtering) and splicing the optical fiber with another optical fiber (e.g., by fusion splicing). In certain embodiments, this process can be repeated to make a concatenated optical fiber with several junctions.

In some embodiments, the junctions may comprise a partially reflective material. Examples of partially reflective materials that may be suitable for the methods and systems of the present disclosure include, but are not limited to nanoparticles, metals, dielectrics, dichroics, polarizers, depolarizers, a nanoscale material, a metamaterial, and any combination thereof.

In some embodiments, the methods and systems of the present disclosure may comprise one or more sensors. The sensors may capture measurements corresponding to the subterranean formation and/or the drilling system. In some embodiments, the sensors sense a downhole condition. Examples of downhole conditions that may be sensed by the sensors of the present disclosure include, but are not limited to chemical composition, strain, temperature, pressure, salinity, lithology, porosity, pH, vibration, acoustics, gas cut, nuclear magnetic resonance, resistivity, spectrographic conditions, chromatographic conditions, and any combination thereof.

In certain embodiments, all or a portion of the optical fiber of the present disclosure may be a sensor. For example, some optical fibers may exhibit changes in physical properties upon exposure to downhole conditions such as temperature, pressure, or vibrations. The changes in physical properties may affect light propagation in the fiber, modulating an optical property of the light traveling therein. In certain embodiments, the optical fiber is a distributed sensor. In certain embodiments, the distributed sensor may measure a continuous profile of a downhole condition.

In certain embodiments, the partially reflective material may be a sensor. In some embodiments, nanoparticles may comprise a partially reflective sensor. For example, in some embodiments, the properties of nanoparticles may change with temperature, strain, pH, chemical compositions, or other downhole conditions. In certain embodiments, these properties can affect the absorption spectra of the nanoparticles, changing an optical property of the light reflected from the partially reflected nanoparticles.

In some embodiments, the methods and systems of the present disclosure comprise an optical source. In certain embodiments, the optical source may be a laser, light emitting diode (LED), or any other light source suitable to transmit an optical signal through an optical fiber. In some embodiments, the light source transmits an output optical signal. In certain embodiments, the output light wave is a broadband light wave. In certain embodiments, the output optical signal is a narrow band light wave.

In some embodiments, the methods and systems of the present disclosure comprise an optical detector. The optical detector may comprise a photodiode, a photo-detector, a charge coupled device (CCD), or any other suitable optoelectric converter. In some embodiments, the optical detector may detect a reflected optical signal or reflected light wave.

In certain embodiments, a concatenated optical fiber is positioned in a wellbore. In some embodiments, the junctions of a concatenated optical fiber comprise silver nanoparticles. In some embodiments, the silver nanoparticles at each junction are operative to reflect a different optical signal from the other junctions. In certain embodiments, each reflected optical signal comprises different wavelengths of light. In certain embodiments, the reflected optical signals are indicative of a downhole condition at different portions of the subterranean formation along the fiber. In certain embodiments, the reflected optical signal of each junction is indicative of the same or different downhole conditions. In some embodiments, the concatenated optical fiber system may provide distributed downhole condition data while also allowing at least a portion of the optical signal to travel the entire length of a fiber. In some embodiments, the concatenated optical fiber may be coupled to a subsurface device.

Figure 4:
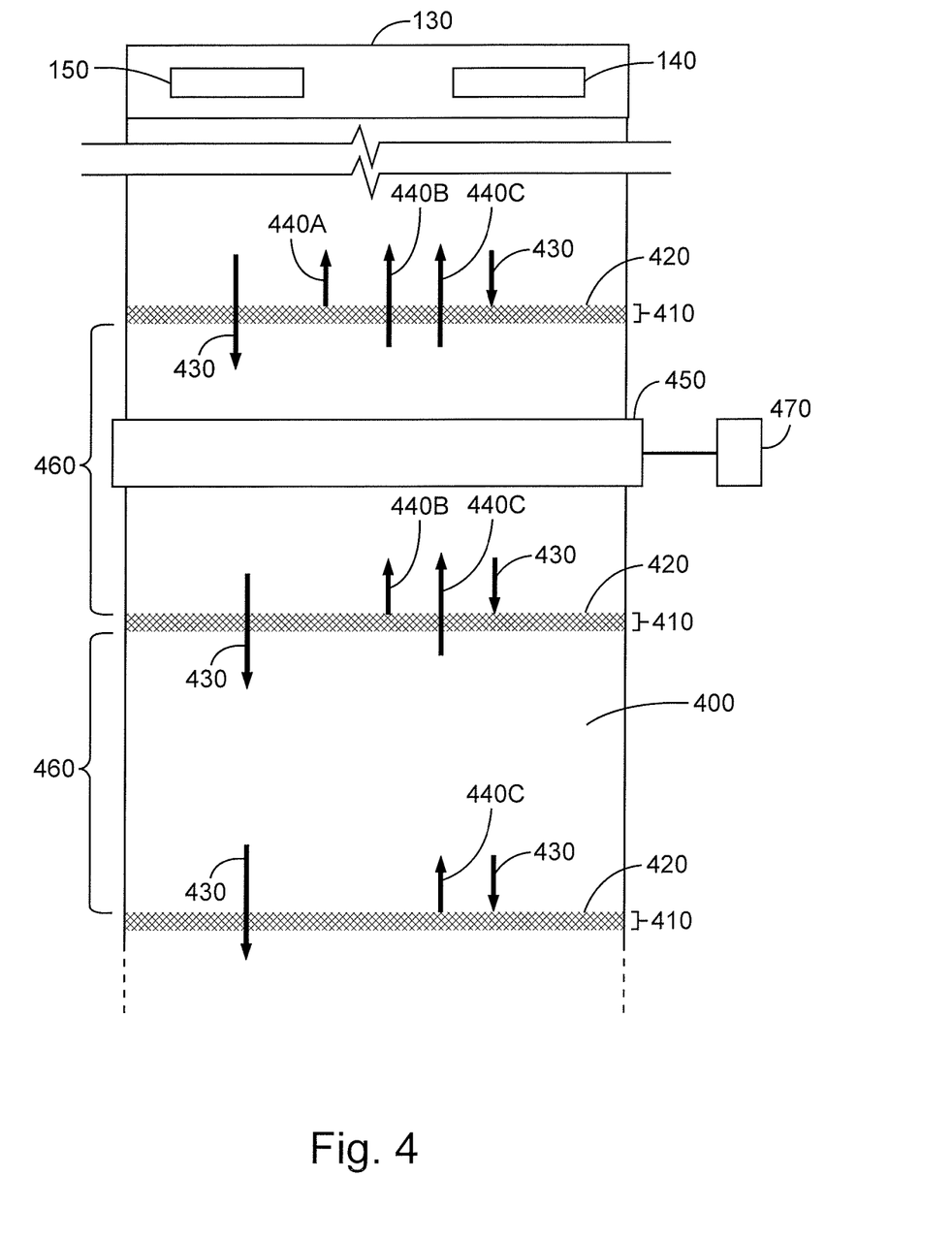
FIG. 4 is a schematic partial cross-sectional diagram of a concatenated optical fiber used to determine downhole conditions in accordance with some embodiments of the present disclosure.

FIG. 4 depicts an embodiment of a concatenated optical fiber 400. The concatenated optical fiber 400 is shown with junctions 410 comprising partially reflective material 420 between sections 460 of concatenated optical fiber 400. Downgoing optical signals 430 from an optical source 140 travel through the concatenated optical fiber 400. A portion of the downgoing optical signals 430 is reflected by the partially reflective material 420 of each junction 410. The reflected optical signals 440 are detected by the optical detector 150. For example, a portion of the downgoing optical signals 430 may be reflected by the partially reflective material 420 of a junction 410 and travels back to the optical detector 150 as a reflected optical signal 440A. The unreflected downgoing optical signals 430 travel through the concatenated optical fiber 400 at least until the next junction 410, where a portion of the downgoing optical signals 430 may be reflected by the partially reflective material 420 as reflected optical signal 440B. Reflected optical signal 440B may travel back through the previous junctions 410 to the optical detector 150. Again, the unreflected downgoing optical signals 430 may continue to the next junction 410 where a portion of the downgoing optical signals 430 may be reflected by the partially reflective material 420 as reflected optical signal 440C, which may travel back through the previous junctions 410 to the optical detector 150.

In some embodiments, the downgoing optical signals 430 and/or reflected optical signals 440 may be modulated by an optical modulator 450 coupled to one or more sections 460 of concatenated optical fiber 400. The optical modulator 450 may be coupled to a sensor 470 or a control toolbus (not shown). In certain embodiments, the downgoing optical signals 430 and/or reflected optical signals 440 may be modulated by changes in physical properties of the concatenated optical fiber 400 such as exposure to temperature, pressure, or vibrations. Although FIG. 4 depicts only three junctions 410, embodiments may comprise as many junctions 410 as are needed. Accordingly, many more reflected optical signals 440 may travel through the junctions 410. In some embodiments, at least a portion of the downgoing optical signals 430 reaches the end of the concatenated optical fiber 400.

In certain embodiments, the methods and systems of the present disclosure may comprise spectroscopy. Spectroscopy may be used to analyze physical or chemical properties of a fluid or subterranean formation. In certain embodiments, the spectroscopy may comprise directing a light wave into a fluid or formation sample, detecting a light wave reflected by the sample, and analyzing the reflected light waves. Spectrographic equipment may include light sources, wavelength selectors, filters, light detectors, and analyzers (e.g., spectrometer). In certain embodiments, spectroscopy may be performed in the wellbore using an optical fiber to transmit an optical signal from a remote light source to the sample. In certain embodiments, the reflected optical signal may be transmitted to a remote optical detector by an optical fiber. In some embodiments, the optical fiber comprises a partially reflective material. In certain embodiments, the partially reflective material reflects the optical signal transmitted through the optical fiber onto the spectrographic sample.

In some embodiments, the optical signal is transmitted through a concatenated optical fiber. In some embodiments, the concatenated optical fiber is configured to allow spectrographic analysis of several different samples along the concatenated optical fiber.

In some embodiments, the methods and systems of the present disclosure may comprise methods and systems for transmitting data between a remote location and a wellbore. In certain embodiments, telemetry signals (e.g., data, commands, and/or other information) may be communicated from the downhole tool to a remote location via an optical fiber. For example, in some embodiments, an optical modulator may encode data from a sensor onto an optical signal transmitted through an optical fiber to optically communicate the data to a remote location. In certain embodiments, telemetry signals may be communicated from a remote location to a subsurface device via an optical fiber. For example, an optical modulator at a remote location may modulate an optical signal transmitted through an optical fiber to optically communicate data, commands, and/or information to a subsurface device.

In certain embodiments, an optical fiber may be configured for bi-directional communication, allowing communication to and from the wellbore and the remote location within the same optical fiber. In some embodiments, the upgoing and downgoing signals are differentiated by different wavelengths, bit rates, polarizations, frequencies, phases, or other suitable differentiating methods.

The methods and systems of the present disclosure may also comprise additional components in a wide variety of configurations. For example, the systems and methods of the present disclosure may comprise additional optical components such as interferometers, polarizers, de-polarizers, beam splitters, couplers, mirrors, lenses, filters, modulators, demodulators, multiplexers, demultiplexers, gratings, dispersive elements, tunable filters, isolators, circulators, lasers, amplified spontaneous emission light sources, optical amplifiers, switches, and the like.

To facilitate a better understanding of the present disclosure, the following examples of certain aspects of preferred embodiments are given. The following examples are not the only examples that could be given according to the present disclosure and are not intended to limit the scope of the disclosure or claims.

An embodiment of the present disclosure is a method for remote communication in a wellbore comprising: positioning an optical fiber in the wellbore, wherein at least a portion of the optical fiber comprises a partially reflective coating; transmitting an output optical signal from an optical source through the optical fiber; and receiving a reflected optical signal from the optical fiber at an optical detector, wherein at least one optical property of the reflected optical signal is indicative of a downhole condition.

An embodiment of the present disclosure is a wellbore sensing system, comprising: a concatenated optical fiber comprising a plurality of junctions, wherein at least one of the junctions comprises a partially reflective material; at least one optical source coupled to the concatenated optical fiber; and at least one optical detector coupled to the concatenated optical fiber capable of detecting an optical signal that reflects from the at least one junction.

An embodiment of the present disclosure is a method for determining a downhole condition in a subterranean formation, comprising: positioning a concatenated optical fiber comprising a plurality of junctions in a wellbore, wherein at least one of the plurality of junctions comprises a partially reflective material; transmitting one or more output optical signals from an optical source to the concatenated optical fiber; and receiving one or more reflected optical signals at an optical detector coupled to the concatenated optical fiber, wherein at least one optical property of the one or more reflected optical signals is indicative of a downhole condition.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method for remote communication in a wellbore comprising:
    positioning an optical fiber in the wellbore, wherein at least a portion of the optical fiber comprises a partially reflective coating comprising nanoparticles;
    transmitting an output optical signal from an optical source through the optical fiber, wherein the partially reflective coating reflects some light corresponding to the output optical signal; and
    receiving a reflected optical signal of the transmitted output optical signal corresponding to the light reflected by the partially reflective coating from the optical fiber at an optical detector, wherein at least one optical property of the reflected optical signal is indicative of a downhole condition, wherein the partially reflective coating is located in the wellbore at a position downhole from the optical source and the optical detector.

2. The method of claim 1, wherein the output optical signal is a broadband light wave.

3. The method of claim 1, wherein the at least a portion of the optical fiber further comprises a protective coating selected from the group consisting of: a room temperature vulcanizing silicone, a fiber optic shrink protector, a polyimide microtube, sulfur, potassium sulfide, and any combination thereof.

4. The method of claim 1, wherein the optical fiber is exposed to the wellbore environment.

5. The method of claim 1, further comprising:
    an optical modulator coupled between two sections of the optical fiber; and
    wherein the optical modulator modulates at least one of the reflected optical signal and the output optical signal.

6. The method of claim 1, wherein the optical fiber is coupled to at least one sensor.

7. The method of claim 1, wherein the at least one optical property is selected from the group consisting of: amplitude, phase, polarization, frequency of the optical signal, and any combination thereof.

8. The method of claim 1, wherein the optical fiber is coupled to a spectrometer.

9. The method of claim 1, wherein the partially reflective coating does not comprise a fiber bragg grating.

10. The method of claim 1, wherein the downhole condition is a condition selected from the group consisting of: chemical composition, strain, temperature, pressure, salinity, lithology, porosity, pH, vibration, acoustics, gas cut, nuclear magnetic resonance, resistivity, spectrographic conditions, chromatographic conditions, and any combination thereof.

11. A wellbore sensing system, comprising:
    a concatenated optical fiber comprising a plurality of junctions, wherein at least one of the junctions comprises a partially reflective material comprising nanoparticles;
    at least one optical source coupled to the concatenated optical fiber capable of transmitting an output optical signal through the optical fiber, wherein the partially reflective material is capable of reflecting some light corresponding to the output optical signal;
    at least one optical detector coupled to the concatenated optical fiber capable of detecting a reflected optical signal of the transmitted output optical signal that reflects from the at least one junction, wherein the at least one junction is located in the wellbore at a position downhole from the at least one optical source and the at least one optical detector; and
    an optical modulator coupled between two sections of the concatenated optical fiber, wherein the optical modulator is selected from the group consisting of: an electro-optic modulator, an acousto-optic modulator, a magneto-optic modulator, an electro-absorption modulator or a piezoelectric optical modulator, and any combination thereof.

12. The system of claim 11, wherein the partially reflective material does not comprise a fiber bragg grating.

13. The system of claim 11, wherein the concatenated optical fiber comprises a plurality of sections of optical fiber fusion spliced together at the plurality of junctions.

14. The system of claim 11, wherein the optical modulator is an electro-optic modulator.

15. A method for determining a downhole condition in a subterranean formation, comprising:
    positioning a concatenated optical fiber comprising a plurality of junctions in a wellbore, wherein at least one of the plurality of junctions comprises a partially reflective material comprising nanoparticles;
    transmitting one or more output optical signals from an optical source to the concatenated optical fiber, wherein the partially reflective material reflects some light corresponding to the output optical signal; and receiving one or more reflected optical signals of the transmitted output optical signal corresponding to the light reflected by the partially reflective material at an optical detector coupled to the concatenated optical fiber, wherein at least one optical property of the one or more reflected optical signals is indicative of a downhole condition, and wherein the partially reflective coating is located in the wellbore at a position downhole from the optical source and the optical detector.

16. The method of claim 15, wherein partially reflective material does not comprise a fiber bragg grating.

17. The method of claim 15, wherein an optical modulator modulates at least one of the one or more output optical signals and the one or more reflected optical signals.

* * * * *